United States Patent
Taylor

(10) Patent No.: US 9,125,432 B2
(45) Date of Patent: *Sep. 8, 2015

(54) GASSED BEVERAGES

(71) Applicant: Thos. Bentley & Son Limited, Leeds, West Yorkshire (GB)

(72) Inventor: Roy Kenneth Taylor, Yorkshire (GB)

(73) Assignee: THOS. BENTLEY & SON LIMITED, Leeds (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,942

(22) Filed: Mar. 24, 2014

(65) Prior Publication Data

US 2014/0342076 A1 Nov. 20, 2014

Related U.S. Application Data

(63) Continuation of application No. 12/736,987, filed as application No. PCT/GB2009/050430 on Apr. 28, 2009, now Pat. No. 8,697,162.

(30) Foreign Application Priority Data

Jun. 5, 2008 (GB) .................................. 0810251.9

(51) Int. Cl.
| | |
|---|---|
| *A23L 2/52* | (2006.01) |
| *A23F 3/16* | (2006.01) |
| *A23F 5/24* | (2006.01) |
| *A23L 2/54* | (2006.01) |

(Continued)

(52) U.S. Cl.
CPC . *A23L 2/52* (2013.01); *A23F 3/163* (2013.01); *A23F 5/243* (2013.01); *A23L 2/54* (2013.01); *C12C 5/02* (2013.01); *C12C 11/11* (2013.01); *A23V 2002/00* (2013.01)

(58) Field of Classification Search
CPC ............. A23L 2/52; A23L 2/54; A23L 2/102; C12C 11/11; C12C 2200/26
USPC ................... 426/590, 115, 118, 316, 654, 477
See application file for complete search history.

(56) References Cited

U.S. PATENT DOCUMENTS

| | | | |
|---|---|---|---|
| 3,751,263 A | 8/1973 | Hall | |
| 3,851,071 A * | 11/1974 | Roehrig et al. | ............... 426/590 |
| 5,385,748 A | 1/1995 | Bunger et al. | |

(Continued)

FOREIGN PATENT DOCUMENTS

| | | |
|---|---|---|
| EP | 0745329 A1 | 12/1996 |
| GB | 2 254 771 A | 10/1992 |

(Continued)

OTHER PUBLICATIONS

Bamforth, C.W.; "The relative significance of physics and chemistry for beer foam excellence: theory and practice"; *Journal of the Institute of Brewing*, vol. 110, No. 4; pp. 259-266 (2004) XP009119533.

(Continued)

*Primary Examiner* — Helen F Heggestad
(74) *Attorney, Agent, or Firm* — Nixon & Vanderhye P.C.

(57) ABSTRACT

The use of an additive is described, to reduce disproportionation in a gassed beverage so as to produce a) enhanced retention of the gas in the beverage and b) a desired foaming profile selected from a quick-breaking foam and a persistent foam.

12 Claims, 6 Drawing Sheets

Foam height at t=0 from Ross Miles test, for C1, C2 and C3 at various PS65 concentrations.

(51) Int. Cl.
  *C12C 5/02* (2006.01)
  *C12C 11/11* (2006.01)

(56) References Cited

U.S. PATENT DOCUMENTS

| | | |
|---|---|---|
| 6,180,159 B1 | 1/2001 | Villagran et al. |
| 2006/0051483 A1 | 3/2006 | Watanabe et al. |

FOREIGN PATENT DOCUMENTS

| | | |
|---|---|---|
| JP | 02 027967 A | 1/1990 |
| JP | 06 086660 A | 3/1994 |
| JP | 07 155148 A | 6/1995 |
| JP | 10-295339 A | 11/1998 |
| WO | WO 93/02177 | 2/1993 |
| WO | WO 94/08473 | 4/1994 |
| WO | WO 01/92133 A2 | 12/2001 |
| WO | WO2007/021205 A1 | 2/2007 |
| WO | WO 2008/065401 A1 | 6/2008 |
| WO | WO2009/133391 A1 | 11/2009 |
| WO | WO2009/147416 A1 | 12/2009 |

OTHER PUBLICATIONS

NOSAB TAB Review, Glycerol Monooleate; Nat'l Organic Standards Board Technical Advisory Panel Review; 16 pgs, Sep. 25, 2001.
Encyclopedia of Food Technology, Encyclopedia of Food Technology and Food Science Series, vol. 2, The AVI Publishing Company, Inc., Westport, CT, pp. 427-432, 1974.
A.A. Zotto, Antifoams and Release Agents; Food Additive User's Handbook, pp. 236-241 (1991).
C. Combs, Foams and Silicones in Food Processing, Dow Corning Corporation, pp. 844-846 (2000).
Dow Corning Chemical Manufacturing Solutions, Antifoam Selection Guide, Performance Chemicals from Dow Corning, 8 pgs., Dow Corning Corporation (2010).
SAG 710 Silicone Antifoam Emulsion, http://www.setonresourcecenter.com/msdshazcom/htdocs//HMIS/MSDS_DOD/139/B, 7 pgs., Feb. 10, 2011.
UK Intellectual Property Office Search Report under Section 17(5), British Application No. GB0713123.8, 3 pgs. Oct. 12, 2007.
PCT International Search Report, International Application No. PCT/GB2007/004565, International Filing Date Nov. 28, 2007, 3 pgs, mailed Apr. 17, 2008.
PCT Written Opinion, International Application No. PCT/GB2007/004565, International Filing Date Nov. 28, 2007, 5 pgs.
PCT International Preliminary Report on Patentability, International Application No. PCT/GB2007/004565, International Filing Date Nov. 28, 2007, 6 pgs.
EPO Examination Report, EPO Application No. 07 858 765.6—2114, dated Nov. 16, 2009, 3 pgs.
EPO Response, European Patent Application No. 07858765.6 from PCT/GB2007/004565, Improvements in or Relating to Carbonated Beverages, dated May 26, 2010, 23 pgs.
Response with English translation of claims dated Sep. 1, 2011 to the Russian Office Action dated Jun. 16, 2011, 10 pgs.
Patent Office of the Russian Federation, English translation of Office Action (Inquiry) of the State Examination, dated Jun. 16, 2011, Russian Patent Application No. 2009119289/10(026556), 13 pgs.
Y14006—PCT International Search Report, International Application No. PCT/GB2009/050427 International Filing Date Apr. 28, 2009, 4 pgs.
Y14006—PCT Written Opinion, PCT Application No. PCT/GB2009/050427, International Filing Date Apr. 28, 2009, 5 pgs.
Y14006—PCT International Preliminary Report on Patentability, International Application No. PCT/GB2009/050427, International Filing Date Apr. 28, 2009, 6 pgs.
Protest against Stephenson Group, Ltd. U.S. National Phase Patent Application for WO2009/133391, including Exhibits A-Q, filed Dec. 6, 2010, 29 pgs.
Y14005—PCT International Search Report, International Application No. PCT/GB2009/050428, International Filing Date Apr. 28, 2009, 4 pgs.
Y14005—PCT Written Opinion, International Application No. PCT/GB2009/050428, International Filing Date Apr. 28, 2009, 5 pgs.
Y14005—PCT International Preliminary Report on Patentability, International Application No. PCT/GB2009/050428, International Filing Date Apr. 28, 2009, 6 pgs.
Protest against Stephenson Group, Ltd. U.S. National Phase Patent Application for WO2009/133392, including Exhibits A-N, filed Dec. 6, 2010, 13 pgs.
Y14007—PCT International Search Report, International Application No. PCT/GB2009/050430, International Filing Date Apr. 28, 2009, 4 pgs.
Y14007—PCT Written Opinion, International Application No. PCT/GB2009/050430; International Filing Date Apr. 28, 2009, 6 pgs.
Y14007—PCT International Preliminary Report on Patentability, International Application No. PCT/GB2009/050430, International Filing Date Apr. 28, 2009, 7 pgs.
Protest against Stephenson Group, Ltd. U.S. National Phase Patent Application for WO2009/147416, including Exhibits A-T, filed Dec. 22, 2010, 21 pgs.
Kirk-Othmer, Food and Feed Technology, vol. 1, John Wiley & Sons, Inc., 3 pgs, 2008.
Kloek, et al; Effect of Bulk and Interfacial Rheological Properties on Bubble Dissolution; Journal of Colloid and Interface Science, vol. 237, pp. 158-166 (2001).
Brent S. Murray, Stabilization of Bubbles and Foams, Current Opinion in Colloid & Interface Science, vol. 12, pp. 232-241 (2007).
Murray Brent S., Interfacial Rheology of Food Emulsifiers and Proteins, Current Opinion in Colloid & Interface Science, vol. 7, pp. 426-431 (2002).
Notice of Opposition to EP Patent No. EP2088876, Appln No. EP07858765.6, Date of mention of grant in the EP Patent Bulletin Dec. 29, 2010, Proprietor of the Patent—Stephenson Group Limited, Opponent—The Thompson Gray LLP, 25 pgs.
Dow-Corning Antifoam 1500, www.us.chemicalbook.com, 2007, 2 pgs.
Notification of the First Office Action issued in Chinese Application No. 200780043878.1, dated Dec. 2, 2011, 6 pgs.

\* cited by examiner

Ross Miles test for C1 with 0 mg/l PS65, run 1 and run 2.

Ross Miles test for C1, C2 and C3 with 0mg/l PS65.

Ross Miles test for C1 with 0-10 mg/L PS65.

Ross Miles test for C2 with 0-10 mg/L PS65.

Ross Miles test for C3 with 0-10 mg/l PS65.

Foam height at t=0 from Ross Miles test, for C1, C2 and C3 at various PS65 concentrations.

Bikerman foaming test with C1 and 0-5 mg/l PS65.

Bikerman foaming test with C2 and 0-5 mg/l PS65.

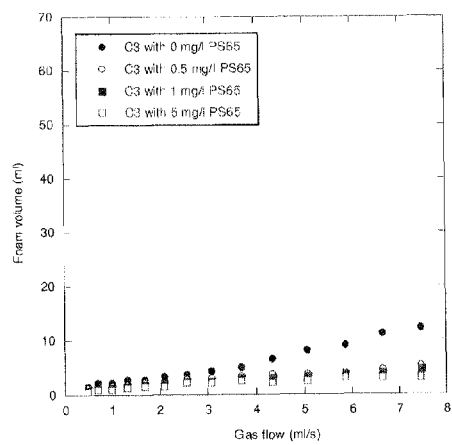
Figure 9: Bikerman foaming test with C3 and 0-5 mg/l PS65.
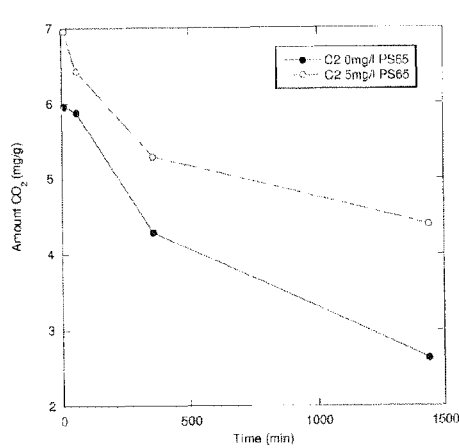
Figure 10: Amount of $CO_2$ (in mg/l) retained for C2 after removing the cap from the bottle.

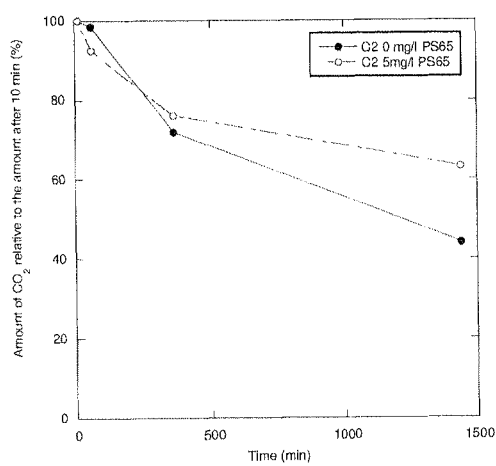
Figure 11: Amount of $CO_2$ (in % of the amount after 10 min) retained for C2 after removing the cap from the bottle.

GASSED BEVERAGES

CROSS-REFERENCES TO RELATED APPLICATIONS

This application is a continuation of application Ser. No. 12/736,987, filed Nov. 30, 2010 (U.S. Pat. No. 8,697,162), which is a 371 of PCT/GB2009/050430, filed Apr. 28, 2009, which claims priority to British Patent Application No. 0810251.9, filed Jun. 5, 2008, the entire contents of each of which are hereby incorporated by reference.

IMPROVEMENTS IN OR RELATING TO GASSED BEVERAGES

The present invention relates to improvements in or relating to gassed beverages. In particular the present invention relates to the combating of foaming and/or control of gas release from gassed beverages, during their manufacture, and/or during filling of the beverages into containers, and/or during dispensing of the beverages.

By "foaming" herein we include the formation of an excessive and/or persistent foam head during filling or dispensing; and the spurting or gushing which may occur when a beverage container is opened.

By "filling" herein we mean filling of containers during manufacture, and thus include canning or bottling.

By "dispensing" or "pouring" herein we mean pouring of a beverage direct from a can or bottle (for example by a person in the home, or by a member of serving staff, for example a steward on an airline, or a bartender), as well as delivering from a mixer unit at home or a multimixer unit in a bar or restaurant.

BACKGROUND OF THE INVENTION

Excessive foaming is a problem that has beset the food and drink industry for many years, and it is described at some length in NOSB TAP Review Compiled by OMRI on Glycerol Monooleate Processing (Sep. 25, 2001).

According to the "NOSB Review", and the many documents it references, mechanical and physical means including heating, centrifuging, spraying and ultrasound have been proposed to combat foaming problems.

Chemical foam control agents have also been proposed or employed (Kouloheris, A. P., Encyclopaedia of Food Technology (1974) 427-432; Zotto, A. A., Food Additives User's Handbook (1991) 236-241; Combs, C., Encyclopaedia of Food Science and Technology (2000) 844-846). Foam control agents disclosed therein include naturally occurring fats and oils, although reference is made to their effectiveness as foam control agents as being limited, due to their poor dispersability in oil/water emulsions. Other foam control agents disclosed in such references are glycerin, lecithin, silicon dioxide, silicones and glycerol monooleate. Use of glycerol monooleate is also discussed in the "NOSB Review".

As is well known, problems with foaming and/or spurting are particularly marked in carbonated soft drinks.

Problems with carbonated beverages may occur:
a) when a carbonated beverage undergoes manufacture, including filling, when substantial agitation is often unavoidable (US 2003/0144365 A1, EP 1504678A and "NOSB Review";
b) when a can or bottle containing a carbonated beverage spurts or gushes on being opened, perhaps having been agitated prior to dispensing, as occurs with cans or bottles dispensed by vending machines or shaken by being carried (U.S. Pat. Nos. 5,378,484 5,820,905);
c) when simply pouring a carbonated beverage from a bottle or can into a glass or cup (U.S. Pat. No. 5,316,779).

Minimising foaming during filling is especially important given its bottlenecking effect during plant operations and its consequent impact on cost, time and throughput volumes: "Containment and inhibition of foam is necessary in food processing for efficient operation of production equipment" ("NOSB Review").

EP 1 504 678A concerns the use of a chemical agent to reduce foaming in a carbonated beverage. It suggests that there is a particular foaming problem with carbonated beverages containing aspartame [APM] as a sweetener. It further states that no satisfactory solution has been devised, and that silicone-based anti-foaming agents carry a bad image with respect to safety. EP 1 504 678A proposes an emulsifier with an HLB value of 1 to 14 and, preferably, a molecular weight of 50-300, to solve the over-foaming problems which arise in carbonated beverages containing aspartame. Preferred emulsifiers are glycerine fatty acid esters, particularly glycerine monofatty acid ester and diglycerine monofatty acid ester.

U.S. Pat. No. 5,316,779 discusses specifically the problem of pouring carbonated soft drinks which form a foam head which is large, and slow to collapse. It comments that carbonated beverages containing the artificial sweetener aspartame produce the most foaming, and the most persistent foam. A solution described in U.S. Pat. No. 5,316,779 is to provide a disposable container coated on its inside (for example on the bottom and side walls of a cup) with an antifoaming agent. Suitable antifoaming agents are said to be commercially available food grade dimethyl polysiloxane antifoams, for example "Dow-Corning Antifoam 1500" and "Union Carbide SAG 710".

U.S. Pat. No. 5,568,973 describes an anti-foaming agent deposited on a stirring or straw element to be placed in a beverage receptacle. The anti-foaming agent speeds up the pouring process and is said to be useful in high volume environments, such airliners, convenience stores, and college bars. The preferred anti-foaming agent is a food grade silicone emulsion.

U.S. Pat. No. 5,820,905 focuses on the problem of "blow-off and splash of canned drinks" and describes a polyglycerol fatty acid ester as an antifoaming agent. A dispersing agent may be employed, having an HLB of at least 5. Examples include polyglycerol fatty acid esters, sucrose fatty esters, polypropylene glycol fatty acid esters, sorbitan fatty acid esters, organic monoglycerides, polysorbates, lactic acid ester derivatives, and the like. The drinks are non-carbonated drinks, which may still suffer from such problems, due to their being packaged with a positive pressure in the headspace of the cans.

U.S. Pat. No. 5,378,484 primarily describes the problem of spurting of the contents of a can containing a low acidity non-carbonated beverage on opening. It suggests the use of a defined sub-class of sucrose fatty acid esters. Furthermore the beverage may contain a hydrophilic emulsifying agent for further increasing the dispersability of the anti-foaming agent in water at a low temperature.

JP 2-27967 (Showa 63-176296) describes preventing spurting on opening a drinks can, in particular containing a low acidity drink such as coffee, cocoa or black tea, by use of a foam control agent, which may be a glycerine fatty acid ester, a sorbitan fatty acid ester or a propylene glycol fatty acid ester.

It will be apparent that very substantial efforts have been made to counter the problems documented in the prior art, of inefficiency in filling, and undesirable effects on dispensing, such as spurting or gushing on opening a bottle or can, and excessive or persistent foaming in a glass or cup.

The commonly-observed problems of foaming when opening cans and bottles and pouring the gassed beverages suggest that the problem persists, particularly in aspartame-containing carbonated "diet" or "lite" beverages. As documented in some of the prior art documents mentioned above there is a particular difficulty in achieving foam control in aspartame-containing carbonated beverages.

A further problem associated with excessive foaming is excessive loss of carbon dioxide, and/or other gas(es), if present, during filling. This is inefficient, not least in consideration of the energy required to produce bottled gases; and it is an undesirable release of gases into the environment. It would be desirable if this problem could be eased.

A yet further problem is the loss of "fizz" of gassed beverages, when poured from a container into a drinking vessel. If excessive gas is lost from the beverage there may be a marked deterioration in its drinking quality. A related problem is that the beverage left in the container (for example a reclosable bottle) may quickly lose its drinking quality or "fizz". A technical measure which solves or reduces this problem of drinking quality, related to foaming and/or retention of gas, could be of high value.

SUMMARY OF THE INVENTION

In accordance with a first aspect of the present invention there is provided a process for procuring desired pouring and drinking qualities in a gas-containing beverage, wherein the process includes the steps of:
  (i) determining whether a quick-breaking foam or a persistent foam is desired;
  (ii) selecting an additive which reduces loss of gas from the beverage when exposed to the atmosphere but without having been poured at a reference temperature;
  (iii) conducting pour tests using different treat rates of the additive in the beverage and measuring foam persistence at the reference temperature;
  (iv) determining one or more treat rates at which the desired quick-breaking foam or persistent foam is achieved at the reference temperature.

The reference temperature is preferably a temperature in the range 0° C. and 30° C., preferably in the range 2° C. and 25° C. and most preferably at 23° C. Most preferably the additive achieves the defined results at all temperatures within the respective stated range.

Preferably in step (ii) the additive (which is also called a control agent herein) also reduces loss of gas from the beverage on pouring, the loss being within the foam which forms, and on breaking of the foam. That is, it is preferably the case that the loss of gas from the beverage on and after pouring is reduced. In each case "reduced" means reduced compared with the situation in the absence of the additive.

In step (ii) the additive is believed to interact, for example coat, the surface of bubbles of gas in the beverage.

The transition between a quick-breaking foam and a persistent foam is believed to be a function of the extent to which the additive coats bubbles of the gas. A thin coating of the additive on the bubbles is believed to inhibit coalescence of bubbles and/or gas transfer through the skin of the bubbles (which is sometimes called "disproportionation" or "Ostwald ripening" primarily in the case of $CO_2$); but to allow bubbles which reach the surface and form foam to break easily, so that the foam collapses. Accordingly the foam which forms does not become excessive and/or dies away rapidly. A thin layer of coating may give essentially no foam, or a low foam, or a foam which dies back rapidly, so that dispensing can be faster than heretofore. This is a desirable result for many beverages including many soft drinks. A larger amount of additive in the beverage may manifest itself as a concentration of free additive in the liquid phase of the beverage and/or as a thicker coating on the bubbles and to produce stronger bubbles which break less easily once they reach the surface and form foam. This is a desirable result for some beverages including some beers. It is important to note that the loss of gas from the beverage on and after pouring is preferably less that it would have been in the absence of the additive, whether a quick-breaking foam or a persistent foam is produced.

In accordance with a second aspect of the present invention there is provided a container containing a gassed beverage capable of producing a foam when the container is opened and the beverage poured, wherein the beverage contains an additive which reduces the rate of release of the gas from the beverage when the container is opened and is left open, without the beverage being poured.

The container may be a bottle or can, and, additionally in the case of beer, a keg or barrel.

In accordance with a third aspect of the present invention there is provided a container containing a gassed beverage capable of producing a foam when the container is opened and the beverage poured, wherein the gas is capable of disproportionation in the beverage, wherein the beverage contains an additive which both reduces the disproportionation of gas in the beverage, and the rate of release of the gas from the beverage when the container is opened and is left open without the beverage being poured.

Preferably the amount of gas present in the beverage 24 hours after opening the container, held at 23° C. throughout, is at least 20% greater, preferably at least 50% greater, than the amount of gas present in a control sample of the same beverage, tested in the same way but having no additive.

Preferably the amount of gas present in the beverage 24 hours after opening the container, held at 23° C. throughout, is at least 50% of the amount of gas present when the container was opened.

For the purpose of these definitions "the amount" of gas present means the total amount of gas which can be extracted from the beverage, including gas which is dissolved under normal conditions. In accordance with a third aspect of the present invention there is provided a gassed beverage which produces a head of foam on the beverage when the beverage is poured, wherein the beverage contains an additive which a) causes a smaller head to be formed when the beverage is poured and b) causes the head to be longer-lasting.

In accordance with a fourth aspect of the present invention there is provided a gassed beverage which produces a head of foam on the beverage when the beverage is poured, wherein the beverage contains an additive which a) reduces the loss of gas from the beverage on pouring, causing a smaller head to be formed when the beverage is poured and b) reduces the loss of gas from the head, causing the head to be longer-lasting.

The paragraphs which follow relate to any aspect of the present invention, expressed above or below, unless we expressly indicate otherwise or unless the context demands otherwise.

Addition of an additive as defined may have a remarkable effect in relation to foam control, when a gassed beverage is formed, or is delivered to a vessel, whether the vessel be a can or bottle in a filling plant, or a drinking vessel such as a glass or cup. Foaming may be significantly reduced. It appears to be the case with many beverages that excessive foaming is inhibited, and any foam head which is produced is often more coarse, and collapses more quickly. Consequently there arise the advantages, that less gas is lost into the atmosphere during filling (giving economic and environmental benefit); and less gas escapes from the beverage when it is poured into a drinking vessel (thereby giving better drinking quality). A further advantage from using an additive of one of the defined classes is that the gas appears to be retained for longer in the beverage in a container which has been opened. The familiar problem of bottled beverages going "flat" (or "losing their fizz") is thereby ameliorated.

The gas may be gassed heavily, as in the case of very fizzy beverages such as cola drinks, or may be gassed lightly.

The gas preferably comprises carbon dioxide. This may be added to the beverage and/or may arise in some cases by a natural process of fermentation. We use the word "carbonated" to describe any carbon dioxide-containing beverage. Carbon dioxide may be the sole gas present or may be part of a gas mixture, for example carbon dioxide with a second gas, preferably an inert gas, for example nitrogen. A second gas is preferably less soluble, and preferably substantially insoluble, than carbon dioxide in the beverage. Preferably a second gas substantially does not undergo disproportionation or Ostwald ripening in the beverage.

Preferably the beverage is acidic. Preferably the pH is in the range 2-6.9, preferably 2.5-6, as measured by a standard pH meter at 23° C. used as recommended by the manufacturer.

When the gas comprises carbon dioxide the carbonic acid content of the beverage will render it acidic or will add to its acidity.

The beverage may be acidulated. By this we mean that it contains an acid of the type to be found in a "tangy" beverage; this is in addition to carbonic acid, when present. Examples may include phosphoric acid, and food acids (sometimes called "wholesome acids") such as citric acid, maleic acid, fumaric acid and tartaric acid. Fruit, fruit juices and fruit extracts contain food acids; and so beverages containing same are acidulated.

The beverage may be water with gas, for example soda water or carbonated mineral water.

The beverage may be a flavoured water beverage.

The beverage may be non-alcoholic. Examples include cola drinks, orange drinks, lemon drinks, lemonade, tonic water, root beer, ginger ale and ginger beer.

The beverage may be gassed coffee or tea or a gassed chocolate drink; or a gassed beverage containing coffee, tea or chocolate flavouring. Such a beverage may contain a dairy product such as milk or cream, or a milk or cream substitute, but is preferably diary-free.

The beverage may be alcoholic, typically having 3-9% wt/wt ethanol. Examples include beer (including lager), cider and so-called "alcopops", which are often carbonated blends of vodka or other spirits, with fruit flavourings. The beverage may be lightly alcoholic, typically having 0.1-3% wt/wt ethanol. Examples include shandy and certain fermented types of root beer, ginger beer and lemonade. By "beer" herein we mean any fermented starch beverage, especially any fermented malt beverage, including such as bitters, lagers, stouts, ales, wheat beers, lambic beers, typically having an alcohol content below 12% by volume. Some beers may have carbon dioxide and/or nitrogen added to them during their production. Others have only carbon dioxide from fermentation. Both are called "carbonated" herein.

The beverage may contain a sweetening agent. The sweetening agent may be a natural or synthetic sweetening agent, for example sucrose, fructose, glucose, maltose, dextrose, corn syrup, a sugar alcohol (for example sorbitol, xylitol, mannitol, maltitol or isomalt), or an intense sweetener (for example saccharin, sucralose, neotame, acesulfame potassium or aspartame).

A "diet" beverage may contain one or more intense sweeteners, for example aspartame.

A "regular" beverage may contain one or more of the bulk sweetening agents, for example sucrose or corn syrup.

Preferably the additive (or control agent) is the only agent present in the beverage to achieve foam control and/or control over gas release.

Preferably the control agent has a molecular weight in the range 200-3000, preferably 300-2500, preferably 400-2000.

Preferably the control agent has an HLB value less than 14, more preferably less than 12, most preferably less than 11. Preferably the control agent has an HLB value greater than 1, more preferably greater than 2, most preferably greater than 3. Preferably the control agent has an HLB value in the range 7-16, preferably 7-14, more preferably 7-12.

The additive may, for example, be a polyoxyethylene sorbitan fatty acid ester, or a sorbitan fatty acid ester, or a polyethylene glycol ester of a fatty acid (PEG ester).

Compounds of these chemical classes are widely accepted by regulatory authorities as being non-toxic. They include compounds which are permitted for use in food and beverage products by both the relevant authorities in the US and in the EU.

HLB number is defined in terms of the widely used method of Griffin. In accordance with this method the molecular weight of the ethylene oxide part of the respective compound is calculated. For example if there are 20 moles of ethylene oxide the molecular weight of that component is 880 (20×44). To this number is added the molecular weight of the fatty acid residue (e.g. monooleate, dilaurate etc.), this essentially gives an overall molecular weight. The molecular weight of the ethylene oxide part is expressed as a percentage of the overall molecular weight, and the resulting percentage value is divided by 5, to yield the HLB value (thus, if the ethylene oxide represents 55% of the total compound weight, the HLB value of the respective compound is 11).

The control agent is preferably present in an amount of at least 0.01 mg/l, preferably at least 0.05 mg/l, preferably at least 0.1 mg/l, most preferably at least 0.5 mg/l, for example at least 0.55 mg/l.

The control agent is preferably present in an amount of up to 100 mg/l, preferably up to 50 mg/l, preferably up to 20 mg/l, preferably up to 10 mg/l, preferably up to 5 mg/l, preferably up to 2 mg/l, for example up to 1 mg/l/. In certain preferred embodiments the control agent is present in an amount less than 0.95 mg/l.

Such concentration ranges refer to the total amounts of control agents present, when more than one such compound is present.

Preferably the PEG part of the PEG esters of a fatty acid is a low molecular PEG moiety, for example a PEG 50-PEG 2000 moiety, preferably a PEG 100-PEG 1000 moiety.

Preferably a control agent (when either a polyoxyethylene sorbitan ester or a PEG ester), used in the present invention comprises at least one mole of ethylene oxide per mole of fatty acid ester; preferably at least 2, preferably at least 3, more preferably at least 4. Preferably it contains up to 36 moles of ethylene oxide per mol of fatty acid ester, preferably up to 24, preferably up to 12, most preferably up to 7.

The presence, in the polyoxyethylene sorbitan ester or PEG ester, of other alkylene oxide moieties such as propylene oxide, is not excluded. However, some polyoxyethylene component must be present, and the polyoxyethylene component itself preferably conforms to the molar definitions given above, without reference to any additional alkylene oxide component. Most preferably, however, the polyoxyethylene component contains ethylene oxide units, and no other alkylene oxide units.

It will be understood by the skilled person, however, that additives of the type described are unlikely to be made up wholly of identical molecules. For example ethoxylated compounds will contain a distribution of polyethoxy chain lengths and a reference to, for example, 20 EO units means an average of 20 EO units per molecule. References to "an additive", and to polyoxyethylene sorbitan fatty acids, sorbitan fatty acid esters and a polyethylene glycol ester of fatty acids are to be construed accordingly.

Control agents may be used in admixture, within the classed defined and across the classes defined. Such concentration ranges refer to the total amount of control agents present, when more than one such compound is present. Concentrations are of the control agent(s) as active, and do not refer to formulated product containing same.

Preferably the fatty acid residues of the defined compounds are residues of $C_6$-$C_{33}$ fatty acids, preferably $C_{10}$-$C_{22}$ fatty acids. The fatty acids may be saturated (for example lauric, stearic) or unsaturated (for example oleic). Typically the compound may have from one to the saturation number of fatty acid residues (the compound being, for example a monooleate, dioleate, monostearate, distearate, monolaurate or dilaurate; or, in the case of a sorbitan compound, being a trioleate or tristearate, for example).

It will be appreciated that many of the parameters expressed above for a control agent of the invention are mean values, given that the control agents are distributions of compounds; for example molecular weight, HLB and number of carbon atoms per molecule or residue. As noted above similar comment applies to degree of ethoxylation, given that ethoxylation produces a distribution.

The Cloud Point (CP) of a preferred control agent, in a 1% aqueous solution, is preferably not greater than 20° C., preferably not greater than 16° C., and more preferably is not greater than 10° C.

For polyoxyethylene sorbitan fatty acid esters a preferred HLB range is 9-16, preferably 10-12.

Preferred polyoxyethylene sorbitan fatty acid esters, and their HLB values, are as follows: —
Polyoxyethylene-(20)-sorbitan tristearate (common name Polysorbate 65), HLB value 10.5-11.0
Polyoxyethylene-(20)-sorbitan trioleate (common name Polysorbate 85), HLB value 11.0
Polyoxyethylene-(4)-sorbitan monolaurate (common name Polysorbate 21), HLB value 13.3
Polyoxyethylene-(20)-sorbitan monostearate (common name Polysorbate 60), HLB value 14.9
Polyoxyethylene-(4)-sorbitan monostearate (common name Polysorbate 61), HLB value 9.6
Polyoxyethylene-(20)-sorbitan monooleate (common name Polysorbate 80), HLB value 15.0
Polyoxyethylene-(5)-sorbitan monooleate (common name Polysorbate 81), HLB value 10.0.

Most preferably the polyoxyethylene sorbitan fatty acid ester is Polysorbate 65.

Preferably the PEG part of the PEG fatty acid esters is a low molecular PEG moiety, for example a PEG 50-PEG 2000 moiety, preferably a PEG 100-PEG 1000 moiety, most preferably PEG 200-PEG 600.

In the case of polyethylene glycol esters of fatty acids the HLB value is preferably less than 13, preferably less than 12, more preferably less than 10, more preferably less than 11, and most preferably less than 9. The polyethylene glycol fatty acid ester preferably has a minimum HLB value of 4, more preferably 5, more preferably 6, or 7.

The polyethylene glycol fatty acid ester is preferably selected from the group including:
PEG 200 monolaurate—HLB 9.3, CP 15° C.
PEG 200 dilaurate—HLB 5.9, CP less than 5° C.
PEG 300 dilaurate—HLB 7.9, CP less than 5° C.
PEG 200 monostearate—HLB 8.1, CP less than 5° C.
PEG 200 distearate—HLB 4.8, CP less than 5° C.
PEG 300 monostearate—HLB 10.3, CP less than 5° C.
PEG 300 distearate—HLB 6.9, CP less than 5° C.
PEG 400 monostearate—HLB 11.7, CP less than 5° C.
PEG 400 distearate—HLB 8.5, CP less than 5° C.
PEG 600 distearate—HLB 10.7, CP less than 5° C.
PEG 200 monooleate—HLB 8.2, CP less than 5° C.
PEG 200 dioleate—HLB 5.0, CP less than 5° C.
PEG 300 monooleate—HLB 10.2, CP less than 5° C.
PEG 300 dioleate—HLB 6.9, CP less than 5° C.
PEG 400 dioleate—HLB 8.3, CP less than 5° C.
PEG 600 dioleate—HLB 10.6, CP 10° C.

Preferably the PEG fatty acid ester is PEG 200 monooleate, PEG 400 dioleate or PEG 600 dioleate.

A sorbitan fatty acid ester preferably has an HLB value of less than 11, more preferably less than 10, and most preferably less than 9. The sorbitan fatty acid ester preferably has a minimum HLB value of 3, and most preferably 4.

The sorbitan fatty acid ester may be compounds with plural ester groups, e.g. triesters, but is preferably a monoester.

The sorbitan fatty acid ester is preferably selected from the group including:
sorbitan monooleate (commonly known as SPAN 80), HLB 4.3
sorbitan monostearate (commonly known as SPAN 60), HLB 4.7
sorbitan monopalmitate (commonly known as SPAN 40), HLB 6.7
sorbitan monolaurate (commonly known as SPAN 20), HLB 8.6.

Preferably the sorbitan fatty acid ester is sorbitan monooleate or sorbitan monolaurate.

Preferably the control agent is added to the beverage, or to a precursor therefor (including a concentrate) as a liquid, though it may in some embodiments be a powder. The control agent may itself be a liquid at ambient temperature, or it may be liquefiable, for example by heating it in order to melt it, or by dissolving or dispersing it in a liquid carrier. The control agent may be part of a concentrate—for example liquid, syrup, powder or dissolvable tablet or block—to which a gassed liquid, for example gassed water, is added.

For non-alcoholic beverages preferred control agents are PEG esters and polyoxyethylene sorbitan fatty acid esters.

For alcoholic beverages preferred control agents are PEG esters, polyoxyethylene sorbitan fatty acid esters, and sorbitan fatty acid esters.

Especially preferred control agents for all beverages are polyoxyethylene sorbitan fatty acid esters, especially Polysorbate 65.

Preferred control agents are used in their as-supplied commercial formulations which may be expected to contain a distribution of related compounds, but with the named control agent being the major components (ie providing at least 51 wt % of the weight of the respective formulation).

In accordance with a further aspect of the present invention there is provided a sealed container containing a gassed beverage of any of the first to fifth aspects. The sealed container is suitably of a pressure-resisting construction, such as a metal can or a deformation-resistant plastics bottle.

In accordance with a further aspect of the present invention there is provided a concentrate for a beverage of any of the first to fifth aspects, the concentrate being mixed in use with water and injected with gaas, or mixed with gassed water to produce said beverage substantially at the time of consumption or dispensing.

The present invention may in this way be utilised in situations such as bars and restaurants, where a carbonated beverage is produced in situ, using what is commonly called post-mix or multimixer apparatus. The concentrate may be liquid or solid, for example a powder. It may suitably be a powder containing an effervescent couple, e.g. an alkali metal (bi)carbonate and an edible organic acid, e.g. citric acid or tartaric acid.

In accordance with a further aspect of the present invention there is provided a method of making a beverage of any of the first to fifth aspects, comprising adding a said control agent to a base beverage (that is, a beverage lacking only the control agent) or a precursor therefor. The precursor could be a non-gassed diluted form, or a concentrate, or an ingredient, or an ingredient mix; in each case in liquid or powder form. The method may include the step of sealing the beverage in pressure-resistant containers. It is found that in accordance with the present invention the filling process is much quicker than without the control agent. The amount of foam formed is reduced, and it collapses more quickly. Both phenomena lead to increased filling rates.

In accordance with a further aspect of the present invention there is provided a gassed beverage comprising coffee, tea or chocolate; or coffee, tea of chocolate flavouring; containing an additive which gives foam control and/or retards the release of gas from the beverage, the additive comprising a polyoxyethylene sorbitan fatty acid ester, or a sorbitan fatty acid ester, or a polyethylene glycol ester of a fatty acid (PEG ester).

In accordance with a further aspect of the present invention there is provided a gassed beverage comprising an additive which gives foam control and/or retards the release of gas from the beverage, wherein the beverage is gassed with nitrogen, and optionally also with carbon dioxide.

In accordance with a further aspect of the present invention there is provided the use of an additive to reduce disproportionation in a gassed beverage so as to produce a) enhanced retention of the gas in the beverage and b) a desired foaming profile selected from a quick-breaking foam and a persistent foam.

Without being bound by theory it is believed that in preferred embodiments a control agent as used herein makes it more favoured for the carbon dioxide to stay in the beverage solution (or, put another way, less favoured for it to burst out of the beverage solution, as carbon dioxide bubbles). Thus we believe that less carbon dioxide is available to make foam. We believe this means that less foam forms; and that more carbon dioxide is retained within the beverage, which stays fizzier. In accordance with our view a foam control agent and/or control agent may be regarded as a gas stabiliser, by which we mean an agent which stabilises gas in the beverage or promotes the retention of gas in the beverage.

DESCRIPTION OF THE DRAWINGS

The invention is further described with reference to the accompanying drawings, in which:

FIG. 9 is a graph showing results achieved in beverage C3 in the Bikerman foaming test (described hereinafter) when using a range of concentrations of Polysorbate 65 and when using a control, free of Polysorbate 65;

FIG. 10 is a graph showing the results of an experiment to study the retention of $CO_2$ in beverage C2 when exposed to the atmosphere, with and without Polysorbate 65 present; with the amount of $CO_2$ in mg/g plotted as a function of time;

FIG. 11 a graph showing the results of the experiment to study the release of $CO_2$ from beverage C2 when exposed to the atmosphere, with and without Polysorbate 65 present; with the percentage decrease in $CO_2$ amount being compared to the amount present after 10 minutes.

EXAMPLES

The invention will now be further described with reference to the following examples.

Examples Set A

Efficacy in Cola Drinks

In these examples the following materials were used:
Coca Cola Light®. Named C1 hereinafter. Contains as sweeteners: sucralose, acesulfame K.
Coca Cola Zero®. Named C2 hereinafter. Contains as sweeteners: aspartame, acesulfame K.
Coca Cola®. Named C3 hereinafter. Contains sugar as the sweetener.
Polysorbate 65, named PS65 hereinafter. PS65 is polyoxyethylene-(20)-sorbitan tristearate (unavoidably with other compounds present, arising from the manufacture), and is sold under the trade mark Kotilen S/3. Its HLB value is 10.5. Alternative Polysorbate 65 products are sold under the trade marks Glycosperse (from Lanza) and Crillet (from Croda).

All beverage samples were purchased at an ordinary supermarket, in 500 ml plastic bottles.

A standard solution of 0.5 wt % of Polysorbate 65 was prepared. This solution was diluted to 0.25 wt % and 0.05 wt % standard solutions. Beverage samples with additive were prepared by adding 1 ml of the different standard solutions to 500 ml beverage (resulting in additive concentrations of 1 mg/l, 5 mg/l and 10 mg/l in the beverage). The control samples (0 mg/l additive) were prepared by adding 1 ml water to 500 ml beverage. The caps of the plastic bottles were closed after addition of the additive and the bottles were gently turned 10 times to mix the additive with the beverage. The beverage samples with additive were equilibrated overnight before they were used in the foaming tests.

The Ross Miles Pour Test Method

Experiments were carried out with a modified Ross Miles pour test method (Ross, S, and Miles, G. D., An Apparatus for Comparison of Foaming Properties of Soaps and Detergents, Oil & Soaps, 18 (1941) 99-102. The test is based on the accurate pouring of a liquid of well defined volume, from a well defined height, onto a defined volume of the same liquid. This test has been defined according to the ASTM (American Society for Testing and Materials) D1173-53 Standard test method. The modification in this example was that a 500 ml plastic bottle was used instead of a 200 ml pipette and there was no liquid at the bottom of the column before pouring the liquid.

Figure 1:
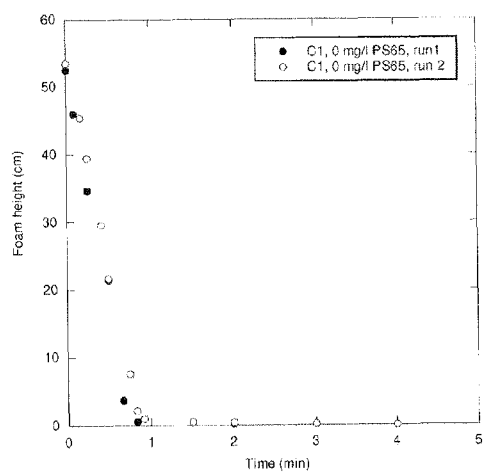
FIG. 1 is a graph showing results achieved in beverage C1 in the modified Ross Miles pour test when using a control, free of Polysorbate 65.
Figure 2:
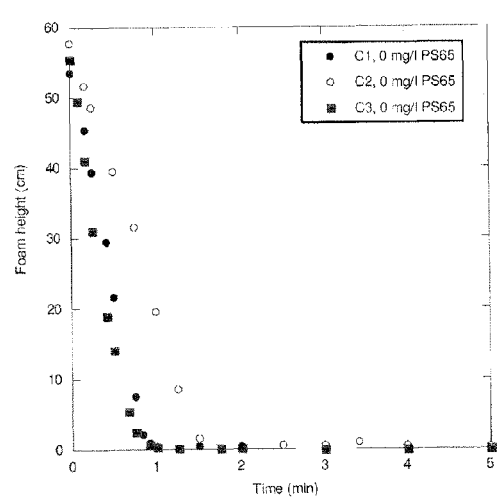
FIG. 2 is a graph showing results achieved in beverages C1, C2 and C3 in the modified Ross Miles pour test when using a control, free of Polysorbate 65.

The results from the Ross Miles pour test are given in FIG. 1-6. The foam height is plotted as a function of time. The good reproducibility of the test is shown in FIG. 1, comparing two runs of the same sample. In FIG. 2 the foaming of C1, C2 and C3 without PS65 is compared. It is noted that C2 produces a more stable foam than C1 and C3.

Figure 3:
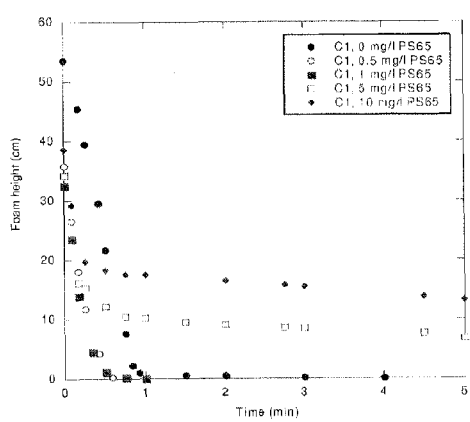
FIG. 3 is a graph showing results achieved in beverage C1 in the modified Ross Miles pour test when using a range of concentrations of Polysorbate 65 and when using a control, free of Polysorbate 65.
Figure 4:
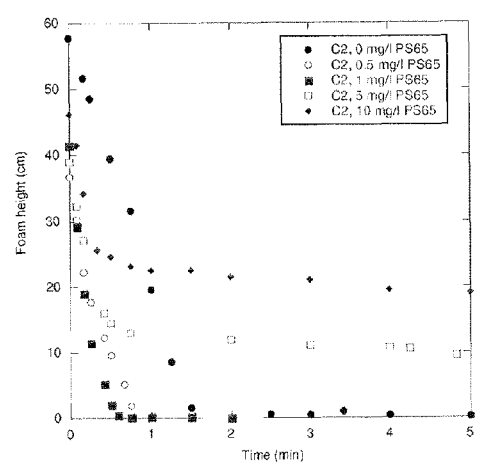
FIG. 4 is a graph showing results achieved in beverage C2 in the modified Ross Miles pour test when using a range of concentrations of Polysorbate 65 and when using a control, free of Polysorbate 65.
Figure 5:
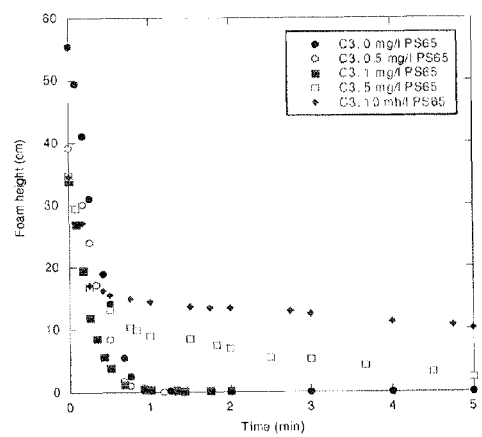
FIG. 5 is a graph showing results achieved in beverage C3 in the modified Ross Miles pour test when using a range of concentrations of Polysorbate 65 and when using a control, free of Polysorbate 65.
Figure 6:
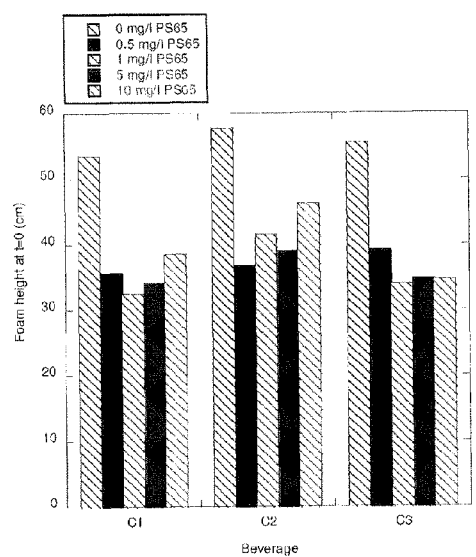
FIG. 6 is a graph showing foam height achieved at t=0 in the three beverages C1, C2 and C3, at a range of concentrations of Polysorbate 65 and when using a control, free of Polysorbate 65.

The foaming of C1 with different concentrations of PS65 is given in FIG. 3. We can note that less foam is produced when PS65 is added. The stability of the foam also decreases with 0.5 mg/l and 1 mg/l PS65. The foam height with 5 mg/l and 10 mg/l PS65 first decreases at short times but thereafter it levels out at longer times. The foam that is stable for long times with 5 mg/l and 10 mg/l PS65 consist of large bubbles, it is very different from the foam produced without PS65. The same trends can also be observed for C2 and C3 (FIGS. 4 and 5). The foam height at t=0 is given in FIG. 6 for the three different beverages.

The Bikerman Foaming Test

Tests were also carried out using the modified standardised Bikerman test. This test is of value in distinguishing between the dynamic foamability and static foam stability. Samples of beverage are foamed in a glass column with a glass frit in the base to create the foam bubbles. The column is 30 cm high and 2 cm in diameter. The gas is thermally equilibrated, saturated with vapour from the liquid and bubbled through the liquid sample (the volume of sample was 12 ml). The steady-state volume, V (cm$^3$), is measured at a series of gas flow rates, U (cm$^3$/s), and the ratio V/U=$\epsilon$ (s) gives the foamability parameter which should be independent of the gas flow rate. Usually, a foam height/flow rate profile is determined. The foam equilibrium decay time $\tau_{1/2}$ can also be determined by switching off the gas flow and measuring the decay of the foam as a function of time. However, the foams here were not suitable enough to record the whole decay curve. Instead the total collapse time of the foam was registered. The gas used was $CO_2$.

Figure 7:
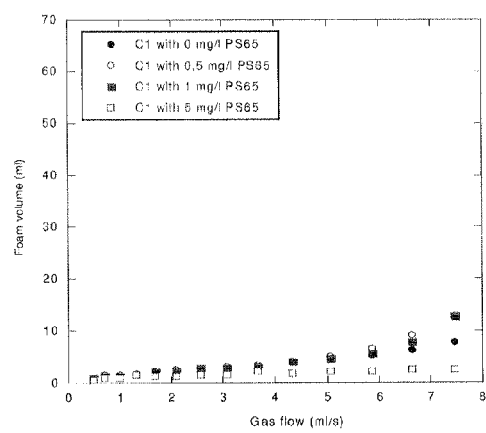
FIG. 7 is a graph showing results achieved in beverage C1 in the Bikerman foaming test (described hereinafter) when using a range of concentrations of Polysorbate 65 and when using a control, free of Polysorbate 65.
Figure 8:
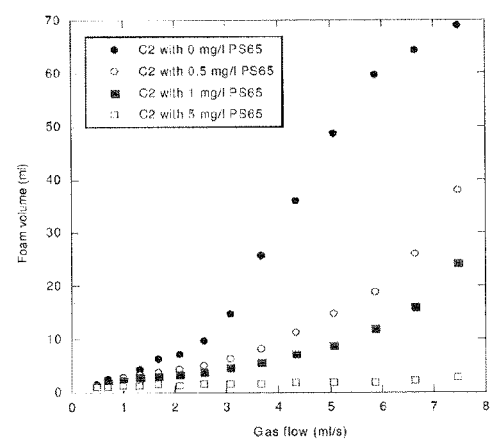
FIG. 8 is a graph showing results achieved in beverage C2 in the Bikerman foaming test (described hereinafter) when using a range of concentrations of Polysorbate 65 and when using a control, free of Polysorbate 65.

The results are given in FIG. 7-9. The two beverages C1 and C3 produce considerably less foam than C2 without addition of PS65. The trend for all three beverages is that less foam is produced with increasing amount of PS65.

The total collapse times, in seconds, of the foams produced in the Bikerman foaming test after the gas has been turned off, are given in Table 1 below. Again we can see that the C2 foam is more stable than the other foams with no PS65. With addition of PS65 the foam stability decreases.

TABLE 1

Table 1: Total collapse time of foam in Bikerman foaming test after the gas has been turned off.

| Beverage | 0 mg/l PS65 | 0.5 mg/l PS65 | 1 mg/l PS65 | 5 mg/l PS65 |
|---|---|---|---|---|
| C1 | <10 s | <10 s | 20 s | <10 s |
| C2 | 36 s | 40 s | 20 s | <10 s |
| C3 | ~10 s | <10 s | <10 s | <10 s |

Carbon Dioxide Analysis

The total amount of carbon dioxide in the beverage was determined by the following method.

To sample the beverage without loss of $CO_2$ a reaction with sodium hydroxide was used. Normally the sample was opened in a closed vessel containing a sodium hydroxide solution. A sample of approximately 1 ml of this mixture was used for the $CO_2$ determination. For some samples (long time suitability tests) the sampling was made by pouring the beverage into a sodium hydroxide solution.

The method used for the determination of $CO_2$ is based on ISO 925. The sample was reacted with boiling dilute hydrochloric acid, the released $CO_2$ was quantified using a detector based on infrared spectroscopy (IR) (in ISO 925 the quantification is gravimetric).

Carbon dioxide analysis was performed on samples with the cap removed for certain times.

Two samples of Coca Cola Zero were analysed at different times after removing the cap from the bottle. The temperature was constant, at 23° C. These samples were not foamed; the release of $CO_2$ to the atmosphere was simply followed as a function of time. The results are given in FIG. 10-11. In FIG. 10 the amount of $CO_2$ in mg/g is plotted as a function of time. We can note that the amount of $CO_2$ after 10 minutes is different for the two samples (with 0 mg/l and 5 mg/l). This may either be due to the fact that the two bottles contain different amounts of $CO_2$ to start with, or that different amounts of $CO_2$ were released as the PS65 (or water) was added during the first 10 minutes. In FIG. 11 the decrease in $CO_2$ amount is compared to the amount at 10 min (in %). After 24 hours ≈60% of the $CO_2$ amount is retained in the sample with 5 mg/l PS65, while only ≈40% is retained in the sample without PS65.

Discussion

Beverages (beers and soft drinks) are usually supersaturated with $CO_2$ and when the beverage is poured from one vessel to another the gas is released by lowering of the pressure. Initially, the release of gas involves the nucleation of gas bubbles. The bubbles grow from catalytic sites which are usually gas pockets or cavities in a solid (i.e. a glass surface). The occurrence of a gaseous phase lowers the free energy for bubble formation. The formation of gas pockets depends on the geometry, surface tension and wettability of the cavity and this causes small bubbles (in the nanoscale size range) to be nucleated. Bubbles are formed spontaneously at the surface of the glass or particles where concave surfaces are formed. The concentration of dissolved gas in equilibrium with the bubble is higher than for a planar surface so the gas is released and grows as nanobubbles.

As the bubbles are released a dispersed system of bubbles in the beverage is produced and the gas is forced across the thin films from smaller bubbles into large bubbles. This process is called disproportionation and it is very important and well established in cases where the gas, such as $CO_2$, is readily soluble in the liquid. Thus, this diffusion process can reduce the total number of bubbles in the system. The driving force for this behaviour is the Laplace pressure over a curved surface. Since the pressure inside a small bubble is greater than in a larger sized bubble, and the gas solubility increases with pressure, more gas dissolves near the small bubbles than the larger ones. This causes diffusion of gas to occur across the walls, with the larger bubbles growing at the expense of the smaller ones. Hence, disproportionation causes the small bubbles to disappear and the larger bubbles to grow, with the overall effect of a coarsening in bubble size. When the bubbles expand in size they begin to rise to the surface (due to the density difference) and collect as foam consisting of spherical bubbles separated by films of liquid.

It is believed that Polysorbate 65 is adsorbed onto the surface of the bubbles where it hinders or slows down this diffusion process. For example monolayer surfactant films can prevent or retard gas diffusion. At low treat rates it is believed that a monolayer of additive is adsorbed onto the surface of the bubbles, sufficient to hinder disproportionation. At higher treat rates it is believed that there is formed a three layer sandwich structure which consists of two films of the encapsulating surfactant shell of the bubble and the inner film of lamella (a continuous phase); and/or that there is unadsorbed additive in the beverage, which contributes to the film boundary around the bubbles in the foam which forms on pouring. In either event it is observed that the foam which forms in beverages at higher treat rates of additive are more robust and/or more persistent.

Thus, at low concentrations of additive, the Polysorbate is believed to produce a thin coating around the bubbles, sufficient to prevent disproportionation. After the pouring some of the larger bubbles float to the surface and break. This gives a short-lived foam. The result is a beverage which has good $CO_2$ retention and modest foaming on pouring (or on container filling).

As the concentration of additive increases, the amount of additive adsorbed increases (and this still gives good disproportionation) and there is a build up of a thicker multilayer around the bubbles. As the larger bubbles rise to the surface the bubbles cannot coalescence since the film separating the bubble interfaces is too thick. This prevents loss of gas from, and breakdown of, the foam. Thus, a stronger foam layer will be produced. This is believed to be the case at high concentrations of Polysorbate 65 (for example 5 mg/l and 10 mg/l).

HLB (Hydrophilic Lipophilic Balance: the HLB value of a surfactant is a measure of the degree of hydrophilicity/lipophilicity of the surfactant. The higher the HLB value, the more hydrophilic is the surfactant. The HLB of Polysorbate 65 is 10.5. The value of HLB is important in order to get adsorption of the surfactant at the surface of the bubbles.

Molecular weight: the molecular weight of the additive may be important. Rapid adsorption of the additive to the small bubbles is needed, so that the bubble is rapidly coated during formation. Thus the molecular weight should not be too high. On the other hand, very small molecules will not form layers that prevent diffusion of gas from one bubble to another one, thus it is not desirable to have too low molecular weight either. The molecular weight of the Polysorbate 65 is 1899 g/mol.

Acidity: pH is also important. The invention is believed to be most effective in acidic beverages, for example of pH 2-6.9. When the beverages are carbonated this produces acidity. Alternatively or additionally many beverages are acidulated.

Examples Set B

Efficacy in Carbonated Coffee Beverages

Carbonated coffee beverages, generally canned and sold cold, for drinking cold, are popular in some countries.

The objective here was to investigate whether Polysorbate 65 can be used to regulate the foam produced by carbonated coffee, both unsweetened and sweetened with various artificial sweeteners. The carbonated coffee was produced during the tests by mixing aqueous solutions of instant coffee with sparkling (carbonated) mineral water.

Materials Used
Nescafe® Original Soluble Coffee
Nescafe® Original Decaffeinated Soluble Coffee
Tesco® Own Label Granulated Sweetener—Ingredients Maltodextrin, Sweetener (Aspartame)
Splenda® Low Calorie Sweetener (Granulated)-Ingredients Maltodextrin, Sweetener (Sucralose 1%)
Hermesetas® Calorie Free Tablets (15 mg)—Ingredients Sweetener Sodium Saccharin
Highland Spring® Sparkling (Carbonated) Spring Water (Certified Organic Land) in 500 ml bottles.
Polysorbate 65 dispersion (0.5%). An aqueous dispersion of liquid Polysorbate 65 was prepared by adding it to hot water at approximately 50° C., mixing and allowing the mixture to cool to 20° C., to produce a 0.5% w/w aqueous dispersion.

Procedure:

Aqueous concentrate control solutions containing instant coffee and, where appropriate, one of the sweeteners, were prepared in warm water, and allowed to cool.

A second treated sample was prepared, identical to the control, but also containing a measured quantity of the 0.5% Polysorbate 65 dispersion.

Into tared 300 ml brimful capacity plastic beakers was weighed differing quantities of the treated concentrate sample. Sparkling water at 15° C. was then poured into the beaker from a height of 20 cm in a steady stream until the foam surface almost reached the top of the beaker, allowing just sufficient space for the foam to expand to the top. The beaker was reweighed to record the total quantity of liquid in the beaker, giving an indication of the overall concentration of ingredients in the final beverage. Time for the foam to subside, to a point leaving at least 75% of the liquid surface clear of foam was noted. For comparison, measurements with the control concentrate sample were carried out in the same way.

Results:
1. Nescafe Decaffeinated Only:
Control Concentrate: 10 g Nescafe Decaffeinated diluted to 50 g with water.
Treated Concentrate: 10 g Nescafe Decaffeinated+10 g of 0.5% Polysorbate 65, diluted to 50 g with water.
The results are shown in Table 2 below.

TABLE 2

| | Control | | Treated | |
|---|---|---|---|---|
| Wt of conc | Total wt poured | Time to clear | Total wt poured | Time to clear |
| 1.0 g | 129 g | >30 min | 133 g | 3 min |
| 2.0 g | — | — | 137 g | 4 min |

TABLE 2-continued

| Wt of conc | Control | | Treated | |
|---|---|---|---|---|
| | Total wt poured | Time to clear | Total wt poured | Time to clear |
| 3.0 g | — | — | 130 g | 4.5 min |
| 4.0 g | — | — | 139 g | 5 min |
| 5.0 g | 132 g | >30 min | 137 g | 5.5 min |
| 6.0 g | — | — | 132 g | 8 min |
| 7.0 g | 140 g | >30 min | 149 g | 11 min |

2. Nescafe Original Only:
Control Conc.: 10 g Nescafe Original diluted to 50 g with water.
Treated Conc.: 10 g Nescafe Original+10 g of 0.5% Polysorbate 65, diluted to 50 g with water.
The results are shown in Table 3 below.

TABLE 3

| Wt of conc | Control | | Treated | |
|---|---|---|---|---|
| | Total wt poured | Time to clear | Total wt poured | Time to clear |
| 1.0 g | 128 g | >30 min | 132 g | 3 min |
| 2.0 g | — | — | 145 g | 4 min |
| 3.0 g | — | — | 131 g | 4.25 min |
| 4.0 g | — | — | 139 g | 4.5 min |
| 5.0 g | 131 g | >30 min | 132 g | 5 min |
| 6.0 g | — | — | 137 g | 5 min |
| 7.0 g | 132 g | >30 min | 124 g | 6 min |

3. Nescafe Original Sweetened with Aspartame:
Control Conc.: 10 g Nescafe Original+3 g Tesco Granulated Sweetener, diluted to 50 g with water.
Treated Conc.: 10 g Nescafe Original+3 g Tesco Granulated Sweetener+10 g of 0.5% Polysorbate 65, diluted to 50 g with water.
The results are shown in Table 3 below.

TABLE 3

| Wt of conc | Control | | Treated | |
|---|---|---|---|---|
| | Total wt poured | Time to clear | Total wt poured | Time to clear |
| 1.0 g | 121 g | >30 min | 117 g | 2 min |
| 2.0 g | — | — | 112 g | 3 min |
| 3.0 g | — | — | 123 g | 6 min |
| 4.0 g | — | — | 116 g | 5 min |
| 5.0 g | 117 g | >30 min | 124 g | 5 min |
| 6.0 g | — | — | 126 g | 5 min |
| 7.0 g | 119 g | >30 min | 115 g | 5 min |

4. Nescafe Original Sweetened with Sucralose:
Control Conc.: 10 g Nescafe Original+5 g Splenda Granules, diluted to 50 g with water.
Treated Conc.: 10 g Nescafe Original+5 g Splenda Granules+10 g of 0.5% Polysorbate 65, diluted to 50 g with water.
The results are shown in Table 4 below.

TABLE 4

| Wt of conc | Control | | Treated | |
|---|---|---|---|---|
| | Total wt poured | Time to clear | Total wt poured | Time to clear |
| 1.0 g | 133 g | >30 min | 140 g | 2.5 min |
| 2.0 g | — | — | 136 g | 3 min |
| 3.0 g | — | — | 117 g | 4 min |
| 4.0 g | — | — | 142 g | 4 min |
| 5.0 g | 125 g | >30 min | 132 g | 4.5 min |
| 6.0 g | — | — | 120 g | 4.5 min |
| 7.0 g | 123 g | >30 min | 128 g | 5 min |

5. Nescafe Original Sweetened with Sodium Saccharin:
Control Conc.: 10 g Nescafe Original+6×15 mg Hermesetas Tablets, diluted to 50 g with water.
Treated Conc.: 10 g Nescafe Original+6×15 mg Hermesetas Tablets+10 g of 0.5% Polysorbate 65, diluted to 50 g with water.
The results are shown in Table 5 below.

TABLE 5

| Wt of conc | Control | | Treated | |
|---|---|---|---|---|
| | Total wt poured | Time to clear | Total wt poured | Time to clear |
| 1.0 g | 121 g | >30 min | 117 g | 3 min |
| 2.0 g | — | — | 121 g | 3 min |
| 3.0 g | — | — | 120 g | 4 min |
| 4.0 g | — | — | 129 g | 5 min |
| 5.0 g | 121 g | >30 min | 121 g | 5.5 min |
| 6.0 g | — | — | 130 g | 5 min |
| 7.0 g | 119 g | >30 min | 126 g | 5 min |

In these tests:
a) The concentrate additions were stopped at 7.0 g, as this gave quite a strong coffee flavour.
b) The quantity of sweetener was adjusted to give a fairly sweet blend.
c) The similarity in fill quantity between controls and treated samples demonstrates that both generated similar quantities of foam, with the treated samples generating a little less, but the treated samples showed much faster collapse and clearing of foam compared with the controls.
d) Addition of the various sweeteners did not slow down the collapse of foam compared with the unsweetened coffee.
e) From the taste 'bite' and 'mouthfeel', the treated samples appeared to contain more residual $CO_2$ compared with controls after standing for 30 minutes.
f) From the quantities of beverage collected in the beakers, it will be seen that the amount of foam generated during pouring was substantial in all cases and most in the aspartame treated beverage.

Examples Set C

Efficacy in Carbonated/Nitrogenated Beer

John Smiths® Extra Smooth Bitter beer was selected. This beer is supplied at 4.0% volume alcohol, in 440 ml cans, which contain a "widget" which injects nitrogen gas into the can when it is opened and the packed pressure is released. The beer being a brewed product, carbon dioxide is also present. The gassing of the beer may be regarded as a carbon dioxide/nitrogen mixture. The objective of this series of tests was to determine the effect of some of our previously identified additives on beer which contains a gas mixture including nitrogen.

Materials Used:

Cans of John Smiths Extra Smooth Bitter, in 440 ml cans from a multipack (i.e. all same batch)

A 0.5% aqueous dispersion of Polysorbate 65, prepared as described above.

A 0.5% aqueous dispersion of Sorbitan Monolaurate.

A 0.5% aqueous dispersion of Sorbitan Monooleate.

A 0.5% aqueous dispersion of PEG 200 Monooleate.

Matching 800 ml squat form borosilicate glass beakers, purchased in a single multipack.

The dispersions of sorbitan monooleate, sorbitan monolaurate and PEG 200 monooleate were prepared in a similar manner to that described for Polysorbate 65. The temperature of the diluent water varied between 10 and 60° C., depending on the additive to be dispersed.

Procedure:

Each of the four chemicals was tested on groups of three cans of beer (beer poured at 13° C.). The three cans were opened together. To one can was added 1.0 g of additive dispersion (11.4 mg/l), to a second can was added 2.0 g 0f additive dispersion (22.7 mg/l), and the third can was used as a control. The cans were not mixed after treatment. The cans were then emptied in quick succession over the side and into each of three beakers, which were gently swirled. The beakers were left to stand and observed for some time, taking notes at various times on the rates of foam collapse.

Controls (i.e. where just water is added) were treated in a similar way, but with an appropriate amount of water, eg. 1.0 g water being added to the beer instead of 1.0 g of the 0.5% Kotilen S/3 (equivalent to 40 mg/l Polysorbate 65).

Results:

Polysorbate 65

Control: Gave a very fine creamy foam, approximately 17 mm thick, which was very stable, and remained with little change apart from slight coarsening and thinning over a 5 hour observation period. Foam thickness was approx. 5 mm after 5 hours.

11.4 mg/l: Gave a similar fine creamy foam, similar thickness, but the foam collapsed more rapidly, with slight coarsening as it collapsed. Some clear areas visible after 120 minutes, and half of the surface was clear of foam after 150 minutes.

22.7 mg/l: Similar behaviour to the 11.4 mg/l sample, some clear areas appeared after 90 minutes, and half surface clear after 120 minutes.

Sorbitan Monolaurate:

Control: As above.

11.4 mg/l: Gave a much coarser foam compared with control, and much thinner (approx. 5 mm). Half surface clear after only 15 minutes.

22.7 mg/l: Gave a much coarser foam compared with control, and much thinner (approx. 5 mm). Half surface clear after only 20 minutes.

Sorbitan Monooleate:

Control: As above.

11.4 mg/l: Gave a very coarse semi-transparent foam, approx. 5 mm thick, which was part clear after only 30 minutes.

22.7 mg/l: Gave a very coarse semi-transparent foam, approx 2-3 mm thick, half surface clear in 5 minutes and totally clear of foam within 15 minutes.

PEG 200 Monooleate:

Control: As above.

11.4 mg/l: Gave a much coarser foam compared with control, and much thinner (approx. 5 mm). Part surface clear after 15 min, half clear of foam after 45 minutes.

22.7 mg/l: Gave a much coarser foam compared with control, and much thinner (approx. 5 mm). Part of surface clear within 30 minutes.

In these tests on beer treated beers showed greater evidence of gas bubbles sitting on inner glass surfaces after standing, and retained more 'bite' to the taste, compared with controls.

The invention claimed is:

1. A method of reducing the rate of release of gas from a gassed acidulated beverage provided in a container, the beverage being capable of producing a foam when the container is opened and the beverage poured, which method comprises the step of introducing an additive into the beverage, which additive reduces the rate of release of the gas from the unpoured beverage in the container when the container has been opened, wherein the additive comprises a polyoxyethylene sorbitan fatty acid ester present in the beverage in an amount of from 0.1 to 20 mg/l.

2. The method as claimed in claim 1 wherein the amount of gas present in the beverage 24 hours after opening the container, held at 23° C. throughout, is at least 20% greater than the amount of gas present in a control sample of the same beverage, tested in the same way but having no additive.

3. The method as claimed in claim 1 wherein the amount of gas present in the beverage 24 hours after opening the container, held at 23° C. throughout, is at least 50% of the amount of gas present when the container was opened.

4. The method as claimed in claim 1, wherein the gas comprises nitrogen and/or carbon dioxide.

5. The method as claimed in claim 1, wherein the polyoxyethylene sorbitan fatty acid ester is selected from one or more of the following:
   polyoxyethylene-(20)-sorbitan tristearate,
   polyoxyethylene-(20)-sorbitan trioleate,
   polyoxyethylene-(4)-sorbitan monolaurate,
   polyoxyethylene-(20)-sorbitan monostearate,
   polyoxyethylene-(4)-sorbitan monostearate,
   polyoxyethylene-(20)-sorbitan monooleate, and
   polyoxyethylene-(5)-sorbitan monooleate.

6. The method as claimed in claim 5, wherein the polyoxyethylene sorbitan fatty acid ester is selected from one or both of the following:
   polyoxyethylene-(20)-sorbitan tristearate, and
   polyoxyethylene-(20)-sorbitan trioleate.

7. The method as claimed in claim 1, wherein the additive is present in an amount from 0.1 to 10 mg/l.

8. The method as claimed in claim 1, wherein the process of filling the container is made quicker by the presence of the additive.

9. The method as claimed in claim 1, wherein the additive also reduces the loss of gas into the atmosphere during filling of the container.

10. The method as claimed in claim 1, wherein the additive also reduces the escape of gas from the beverage when it is poured into a drinking vessel.

11. A method of reducing the rate of release of a gassed acidulated beverage in a container, the beverage being capable of producing a foam when the container is opened and the beverage poured, wherein the gas is capable of disproportionation in the beverage, which method comprises the step of introducing an additive into the beverage, which additive both reduces the disproportionation of gas in the beverage, and reduces the rate of release of the gas from the beverage when the container is opened and is left open without the beverage being poured; wherein the additive comprises a polyoxyethylene sorbitan fatty acid ester in the amount of 0.1 to 20 mg/l.

12. A container containing a gassed beverage capable of producing a foam when the container is opened and the beverage poured, wherein the beverage contains an additive which reduces the rate of release of the gas from the beverage when the container is opened and is left open without the beverage being poured, wherein the additive comprises a polyoxyethylene sorbitan fatty acid ester present in the beverage in an amount of from 0.1 to 20 mg/l.

* * * * *